United States Patent [19]

Kawasaki et al.

[11] Patent Number: 4,752,084
[45] Date of Patent: Jun. 21, 1988

[54] INSTRUMENT PAD ARRANGEMENT IN AUTOMOTIVE VEHICLE

[75] Inventors: Tomoaki Kawasaki, Hatano; Hiroo Okuyama, Isehara, both of Japan

[73] Assignee: Nissan Motor Co., Ltd., Japan

[21] Appl. No.: 997

[22] Filed: Jan. 7, 1987

[30] Foreign Application Priority Data

Jan. 9, 1986 [JP] Japan ................... 61-1445[U]

[51] Int. Cl.⁴ .......................................... B60R 21/045
[52] U.S. Cl. ...................................... 280/752; 296/72
[58] Field of Search .................. 280/752, 753; 296/70, 296/72

[56] References Cited

U.S. PATENT DOCUMENTS

| 712,501 | 11/1902 | Connell | 296/72 |
| 3,861,486 | 1/1975 | Wilfert | 280/752 |
| 3,876,228 | 4/1975 | Hawkins et al. | 280/752 |

Primary Examiner—Kenneth R. Rice
Attorney, Agent, or Firm—Leydig, Voit & Mayer

[57] ABSTRACT

A core of an instrument pad is connected to a glove box reinforcement by way of a stay. The glove box reinforcement is in turn secured to a vehicle body by way of an instrument stay and a side bracket, etc.

5 Claims, 4 Drawing Sheets

INSTRUMENT PAD ARRANGEMENT IN AUTOMOTIVE VEHICLE

BACKGROUND OF THE INVENTION

1. Field of the Invention

The present invention relates in general to instrument panels for automotive vehicles and more particularly to an instrument pad arrangement in an automotive vehicle.

2. Description of the Prior Art

An example of a prior art instrument pad arrangement in an automotive vehicle is shown in FIGS. 3 and 4. Referring to the figures, the instrument pad arrangement is generally indicated by the reference numeral 10 and shown as including an instrument panel 12 and an instrument pad 14. The instrument pad 14 is adapted to cover the outer surface of the instrument panel 12 with a view to preventing a vehicle passenger from being injured by the instrument panel 12 upon a head-on collision or the like. The instrument panel 12 has a glove box section 16 in front of an assistant driver's seat. The glove box section 16 has a top wall 16a and a depending wall 16b depending from the forward end of the top wall 16a to form therewith an L-like section. An opening 18 is provided to the glove box section 16 in such a manner as to extend from the rearward part of the top wall 16a to the lower end of the depending wall 16b. The opening 18 is closed by a glove box reinforcement 20 in the form of an L-like section and having a top wall 20a and a depending wall 20b depending from the forward end of the top wall 20a. The reinforcement 20 is secured at the depending wall 20b to a vehicle body by way of an instrument stay 22, etc. and is also secured at the forward end of the top wall 20a to the top wall 16a of the glove box section 16 by means of screws 24. The instrument pad 14 consists of a shock absorbing body 14a such as a foamed plastic material and a core 14b embedded in the shock abosrbing body 14a. A plurality of clips 26 are secured to the core 14b in such a manner as to project from the inner surface of the shock absorbing body 14a. The clips 26 are inserted into the corresponding openings 28 formed in the instrument panel 12 so as to secure the instrument pad 14 to the instrument panel 12. A glove box lid 30 is installed on the glove box section 16 by means of a hinge 32.

A disadvantage of the prior art instrument pad arrangement is that the clips 26 are liable to be damaged or broken by shocks and vibrations applied to the instrument panel 12, resulting in undesirable play or, in the extreme case, rattling of the instrument pad 14. Further, upon a head-on collision or the like, the instrument pad 14 may possibly be detached or disconnected from the instrument panel 12. This is quite undesirable from a safety point of view.

SUMMARY OF THE INVENTION

In accordance with the present invention, there is provided a novel and improved instrument pad arrangement in an automotive vehicle. The instrument pad arrangement comprises an instrument panel, means for securing the instrument panel to a vehicle body, an instrument pad covering the instrument panel and having a core and a stay directly connecting the core of the instrument pad to the securing means.

The above structure is quite effective for overcoming the above noted disadvantage inherent in the prior art arrangement.

It is accordingly an object of the present invention to provide a novel and improved instrument pad arrangement in an automotive vehicle which can assuredly prevent an instrument pad from becoming loose in its attachment or fitting.

It is another object of the present invention to provide a novel and improved instrument pad arrangement of the above described character which can assuredly prevent the instrument pad from being detached or disconnected from an instrument panel upon a head-on collision or the like.

It is a further object of the present invention to provide a novel and improved instrument pad arrangement of the above described character which does not require so much increase in weight as compared with a comparable prior art arrangement.

It is a still further object of the present invention to provide a novel and improved instrument pad arrangement of the above described character which is practically quite effective though so simple in structure.

DETAILED DESCRIPTION OF THE PREFERRED EMBODIMENT

Figure 1:
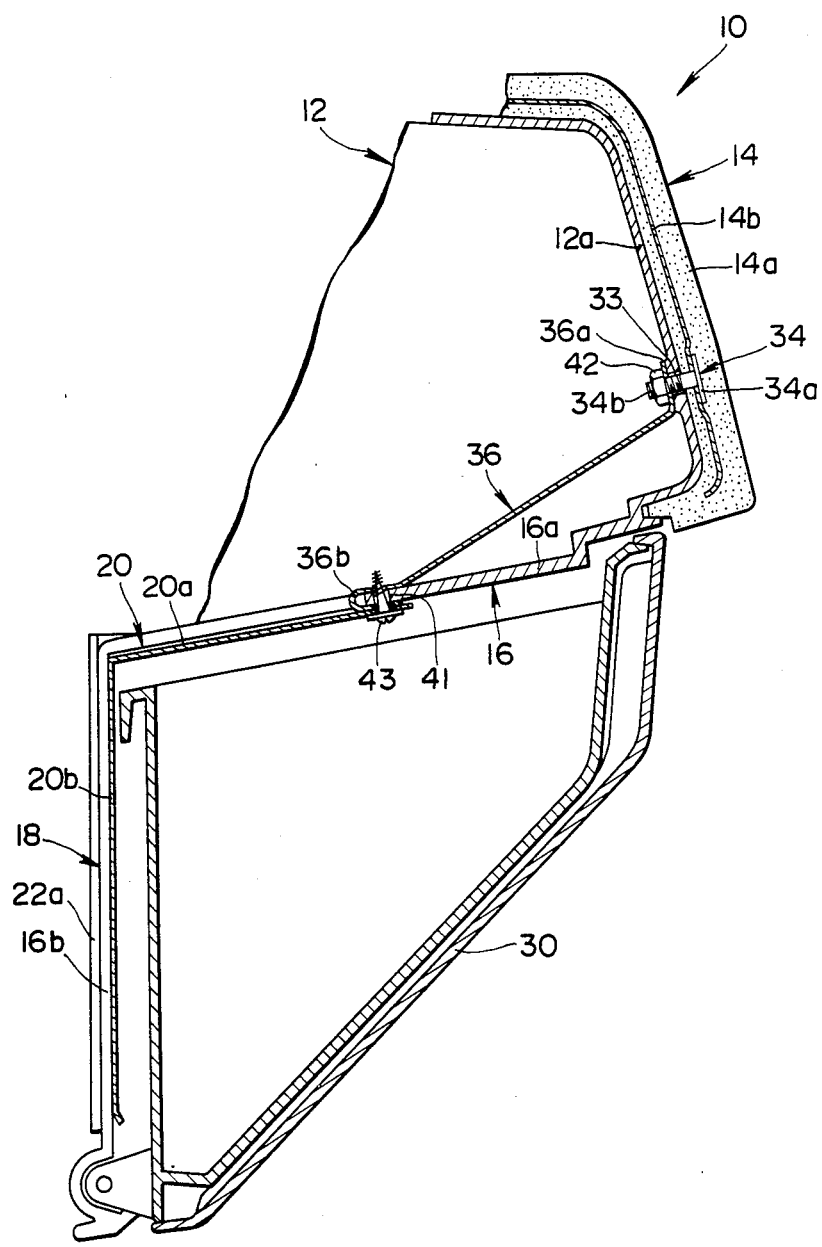
FIG. 1 is a sectional view similar to FIG. 4 but showing an instrument pad arrangement in an automotive vehicle according to an embodiment of the present invention.
Figure 2:
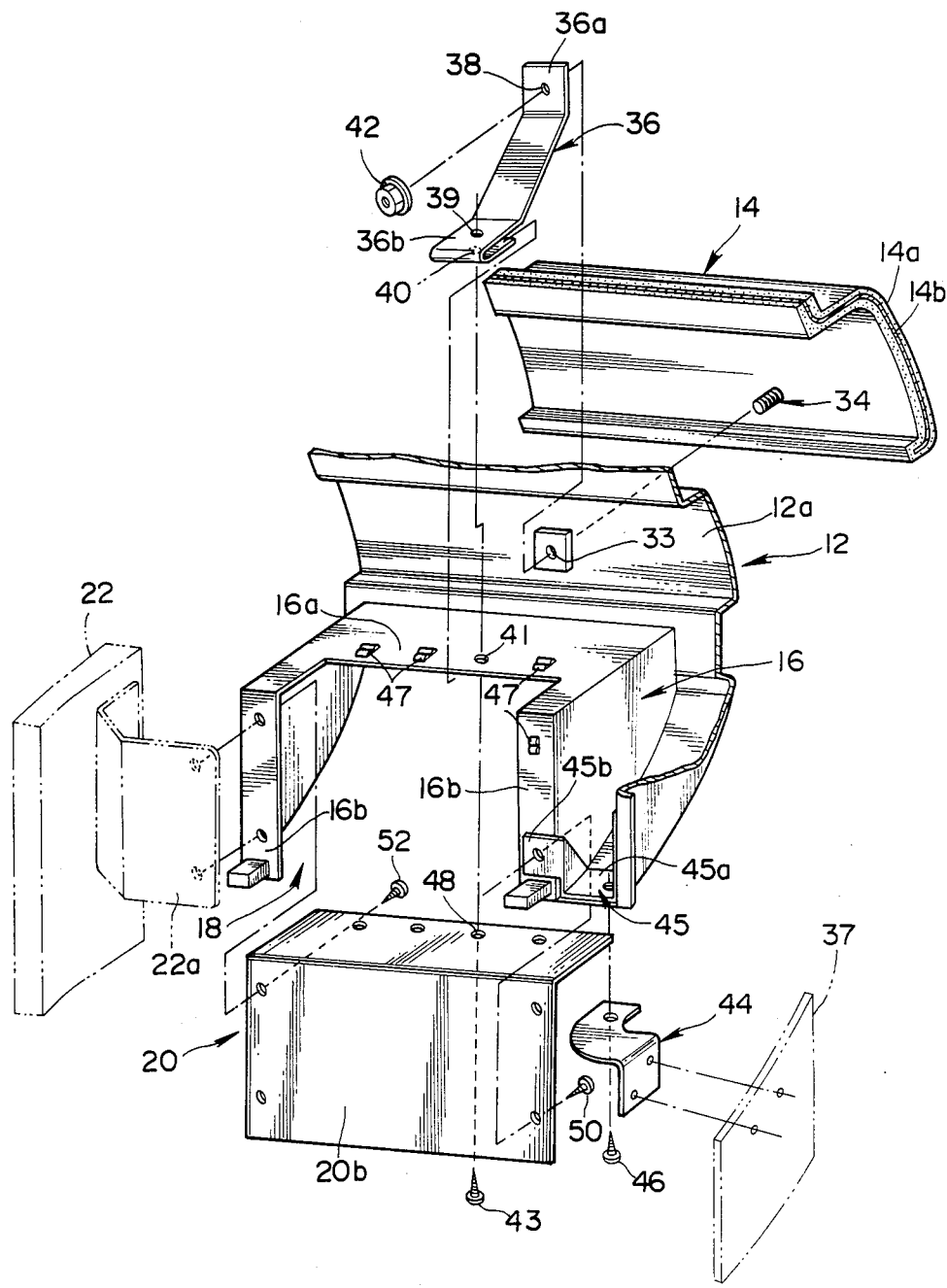
FIG. 2 is a fragmentary exploded view of the instrument pad arrangement of FIG. 1.
Figure 3:
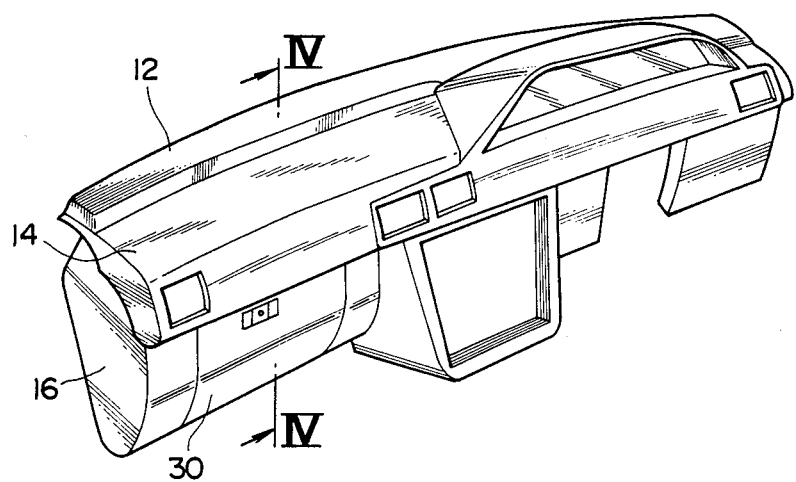
FIG. 3 is a perspective view of a prior art instrument panel.
Figure 4:
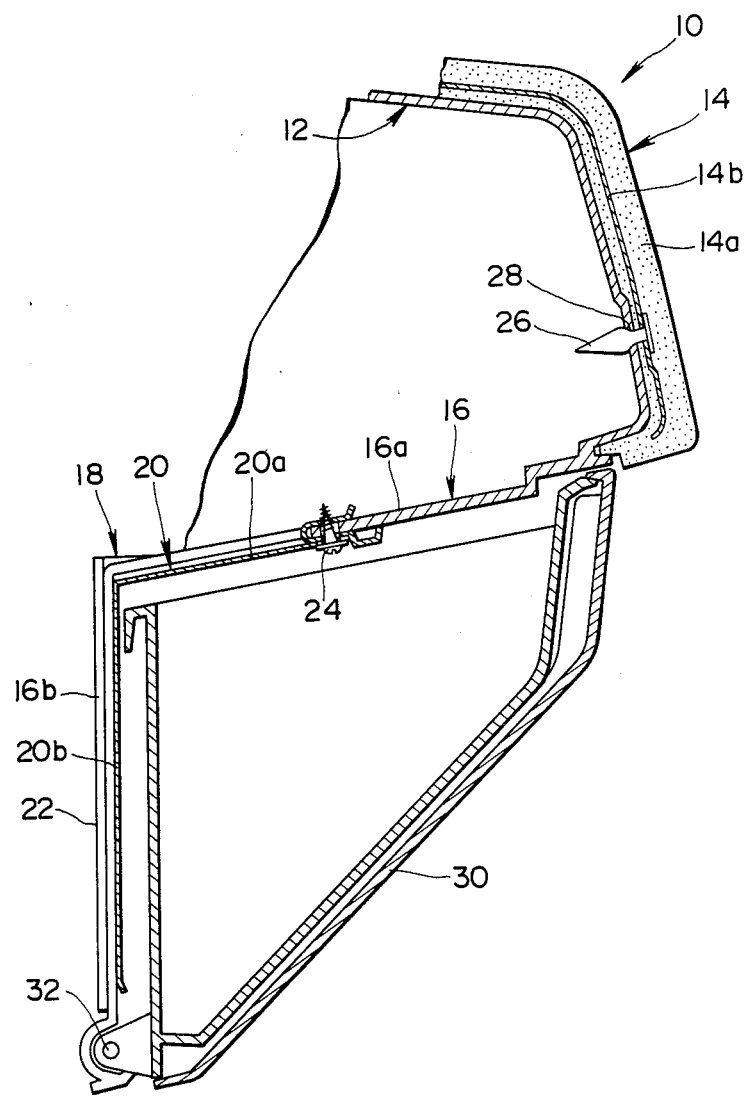
FIG. 4 is an enlarged sectional view taken along the line IV—IV of FIG. 3 and showing a prior art instrument pad arrangement.

Referring to FIGS. 1 and 2, in which like or corresponding parts to those of the prior art instrument pad arrangement of FIG. 4 are designated by the like reference characters, the instrument panel 12 has an upstanding wall 12a upstanding from the rearward end of the top wall 16a of the glove box section 16 and formed with a bolt accommodation hole 33. The rigid core 14b has secured thereto a bolt 34 at a place corresponding to the bolt accommodation hole 33. The bolt 34 has a head portion 34a secured to the core 14b and a threaded stem portion 34b projecting from the inner surface of the instrument pad 14. A padding stay 36 is provided to connect the core 14b of the instrument pad 14 to a vehicle body 37 such as a dash upper, dash lower, etc. More specifically, the padding stay 36 is made of a hard material as metal so as to have a sufficient rigidity and shaped into the form of a strip or band. The padding stay 36 is arranged to span between the part of the upstanding wall 12a where the bolt accommodation hole 33 is provided and the forward edge of the top wall 16a of the glove box section 16. In this instance, the forward edge of the top wall 16a defines a rearward end of the opening 18. The padding stay 36 has a rearward end 36a bent to extend along the inner surface of the upstanding wall 12a of the instrument panel 12 and formed with a bolt accommodation hole 38 aligned with the bolt accommodation hole 33 and also has a forward end 36b formed into a U-like shape and formed with a pair of axially aligned screw accommodation holes 39, 40. The U-shaped forward end 36b of the padding stay 36 is adapted to clamp or receive the forward edge of the top wall 16a of the glove box section 16, which forward edge is formed with a screw accommodation hole 41 aligned with the screw accommodation holes 39, 40. The rearward end 36a of the padding stay 36 is connected to the core 14b and the instrument panel by means of the bolt 34 arranged to pass at the stem portion 34b through the bolt accommodation holes 33, 38 and a nut 42 screwed onto the threaded stem portion 34b. On the other hand, the forward end 36b of the padding stay 36 is connected to the forward edge of the top wall 16a of the glove box section 16 by means of a screw 43 screwed into the screw accommodation holes 39, 40, 41.

The glove box section 16 is provided with a side bracket 44 and a reinforcement bracket 45 as shown in FIG. 2. The reinforcement bracket 45 has an end 45a cooperating with the side bracket 44 to interpose therebetween a lower part of the instrument panel 12 and is fastened thereto with a screw 46. The reinforement bracket 45 is brought into contact at the other end 45b with the depending wall 16b of the glove box section 16. The glove box reinforcement 20 is attached to the top wall 16a and the depending wall 16b of the glove box section 16 by means of a plurality of expansion nuts 47. The top wall 20a of the reinforcement 20 is formed at the forward end thereof with a screw accommodation hole 48 to be aligned with the screw accommodation holes 39, 40 of the padding stay 36 and the screw accommodation hole 41 of the top wall 16a of the glove box section 16 when installed in place. The reinforcement 20 is fastened to the U-shaped forward end 36b of the padding stay 36 by allowing the forward edge of the top wall 20a to lap on the lower face of the U-shaped forward end 36b of the padding stay 36 and then allowing the screw 43 to be screwed into the screw accommodation holes 39, 40, 41 through the screw accommodation hole 48. The depending wall 20b of the reinforcement 20 has an end cooperating with the end 45b of the reinforcement bracket 45 to interpose therebetween a lower part of the depending wall 16b of the glove box section 16 and is fastened thereto with a screw 50. The depending wall 20b of the reinforcement 20 is in this manner connected at an end to the vehicle body 37 by way of the reinforcement bracket 45 and the side bracket 44. The other end of the reinforcement 20 is connected to the vehicle body 37 by way of an instrument stay bracket 22a and the instrument stay 22. In this connection, the bracket 22a is so arranged as to cooperate with the depending wall 20b of the reinforcement 20 to interpose therebetween a lower part of the depending wall 16b of the glove box section 16 and fastened thereto with screws 52.

From the foregoing, it is to be understood that with the instrument pad arrangement 10 of this invention the instrument pad 14 is assuredly prevented from becoming loose in its attachment or fitting since the core 14b of the instrument pad 14 is rigidly connected to the vehicle body 37 by way of the padding stay 36, glove box reinforcement 20, instrument stay bracket 22a and the instrument stay 22 and further by way of the padding stay 36, glove box reinforcement 20, reinforcement bracket 45 and the side bracket 44.

It is further to be understood that the instrument pad 14 is assuredly prevented from being disconnected or detached from the instrument panel 12 even when the instrument panel 12 is subjected to a considerably large impact upon a head-on collision or the like since the instrument pad 14 is rigidly connected to the glove box reinforcement 20 by way of the padding stay 36.

While the present invention has been described and shown as being applied to the glove box section 16 of the instrument panel 12, it may otherwise be applied to a section of the instrument panel 12 other than the glove box section 16.

What is claimed is:

1. An instrument pad arrangement in an automative vehicle having a body, comprising:
   an instrument panel having a rigid reinforcement member secured to a vehicle body;
   an instrument pad covering said instrument panel and having a core;
   a stay having a first end secured to said core of said instrument pad and having a second end secured to said reinforcement member; and
   means, including said stay, for securing said instrument pad to said instrument panel and for securing said instrument pad and said instrument panel to the vehicle body through said reinforcement member.

2. An instrument pad arrangement as set forth in claim 1 wherein said reinforcement member is a glove box reinforcement member.

3. An instrument pad arrangement as set forth in claim 2 wherein said instrument panel includes a glove box section having a top wall and a depending wall depending from a forward end of said top wall, said instrument panel being formed with an opening extending from a rearward part of said top wall to a lower end of said depending wall, said top wall having a forward edge defining a rearward end of said opening, the second end of said stay being formed into a U-like shape and receiving therein said forward edge of said top wall.

4. An instrument pad arrangement as set forth in claim 3 wherein said reinforcement is in the form of an L-like section to extend along said top wall and said depending wall of said glove box section and has a rearward end to lap on the second end of said stay to be fastened thereto.

5. An instrument pad arrangement as set forth in claim 4 said instrument panel has an upstanding wall upstanding from a rearward end of said top wall and is formed with a bolt accommodation hole, said instrument pad having a shock absorbing body in which said core is embedded and a bolt secured to said core at a place corresponding to said bolt accommodation hole, said bolt being inserted into said bolt accommodation hole and cooperating with a nut to fasten said core, said instrument panel and the first end of said stay together.

* * * * *